United States Patent
Focke et al.

(10) Patent No.: US 7,321,332 B2
(45) Date of Patent: Jan. 22, 2008

(54) DEVICE FOR MEASURING ANGLE POSITIONS

(75) Inventors: Thomas Focke, Ahrbergen (DE); Thomas Hansen, Hildesheim (DE); Martin Schneider, Hildesheim (DE); Joerg Schoebel, Salzgitter (DE); Volker Gross, Bielefeld (DE); Oliver Brueggemann, Ilsede (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/537,667

(22) PCT Filed: Sep. 18, 2003

(86) PCT No.: PCT/DE03/03103

§ 371 (c)(1),
(2), (4) Date: May 4, 2006

(87) PCT Pub. No.: WO2004/051308

PCT Pub. Date: Jun. 17, 2004

(65) Prior Publication Data

US 2006/0250296 A1  Nov. 9, 2006

(30) Foreign Application Priority Data

Dec. 4, 2002 (DE) .............................. 102 56 524

(51) Int. Cl.
*G01S 5/04* (2006.01)
*G01S 13/00* (2006.01)

(52) U.S. Cl. .................. 342/432; 342/70; 342/374

(58) Field of Classification Search .................. 342/70, 342/372, 374, 432, 434
See application file for complete search history.

(56) References Cited

U.S. PATENT DOCUMENTS

| 4,232,266 | A | * | 11/1980 | Acampora | 370/323 |
| 4,280,128 | A | * | 7/1981 | Masak | 342/380 |
| 4,387,375 | A | * | 6/1983 | Kleiber et al. | 342/394 |
| 4,686,533 | A | * | 8/1987 | MacDonald et al. | 342/373 |
| 5,017,927 | A | | 5/1991 | Agrawal et al. | |
| 5,172,122 | A | | 12/1992 | Peregrim et al. | |
| 5,706,012 | A | | 1/1998 | Kay | |
| 5,831,570 | A | | 11/1998 | Ammar et al. | |
| 6,504,505 | B1 | * | 1/2003 | Yung | 342/374 |
| 2004/0234012 | A1 | * | 11/2004 | Rooyen | 375/347 |

FOREIGN PATENT DOCUMENTS

WO  WO 00 49423  8/2000

OTHER PUBLICATIONS

M. Skolnik, Introduction to Radar Systems, second edition, McGraw Hill Book Company, 1980, pp. 160 and 161.

* cited by examiner

*Primary Examiner*—Dao Phan
(74) *Attorney, Agent, or Firm*—Kenyon & Kenyon LLP

(57) ABSTRACT

In a device for measuring angular positions by using radar pulses and mutually overlapping beam characteristics of at least two antenna elements, a switchable phase shifter is provided in the signal path of at least one antenna element which is switchable in the time-division multiplexing between different phase states. For the radar received signals, an evaluation device is provided for the joint and especially simultaneous evaluation of signals of two antenna elements with the participation of antenna element, in whose signal path a switchable phase shifter is provided.

10 Claims, 3 Drawing Sheets

DEVICE FOR MEASURING ANGLE POSITIONS

FIELD OF THE INVENTION

The present invention relates to a device for measuring angular positions using radar pulses having mutually overlapping beam characteristics of at least two antenna elements.

BACKGROUND INFORMATION

Radar sensors for recording the nearby motor vehicle environment (SRR, short range radar sensors) may be provided for functions such as backup aid, parking assistance, parking gap measurement, blind spot monitoring, slow bumper to bumper driving or precrash detection.

Besides the information on the distance of relevant objects (other vehicles, traffic lane limitations or parking gap limitations, pedestrians, etc.) information on their angular position relative to the vehicle may also be important for judging the relevance of detected objects for whatever the vehicle is doing. In this regard, the angular direction of objects may be calculated via so-called trilateration. In this method, the distance data of several neighboring sensors are used in order also to determine the angular deviation of targets, using simple trigonometric conversions. With this method more and more sensors may be required at a certain distance apart, even to ascertain the position of only one target. Then too, these sensors in each case have to detect the same target, so as not to obtain faulty estimations.

International Published Patent Application No. WO 00/49423 describes a monopulse phase array antenna system, which has transmitting and receiving modules which are controlled by a beam swivel control device. From the received signals from the various antenna elements, composite signals and angular differential signals are derived. Each of the transmitting and receiving modules is furnished with two 180° phase shifters, in order to determine the angular differential signals. For the independent tracking in the azimuth and elevation direction, one may evaluate a composite signal and two differential signals.

M. Skolnik, Introduction to Radar Systems, second edition, McGraw Hill Book Company, 1980, pages 160 and 161, discuss that one may obtain the angular information of a target object from two mutually overlapping antenna beam characteristics.

SUMMARY OF THE INVENTION

According to an exemplary embodiment of the present invention, angular data may be obtained from an overall radar position finding field, at a limited additional hardware expenditure.

According to an exemplary embodiment and/or exemplary method of the present invention, it may not be required to provide in each receiving path a separate down converter and separate NF processing. The measurement of angular positions may be implemented even using a single sensor. Compared to an implementation that is used only for distance measurement, the position finding field may remain virtually unchanged. The additional hardware expenditure may be limited to a simple phase shifter having a simple signal evaluation.

Because of the angular measurement according to an exemplary embodiment and/or exemplary method of the present invention, the number of sensors required may be minimized for certain functions. A backup aid may be equipped with only one angle measuring SRR sensor, whereas conventional systems may require three sensors. At slow bumper to bumper driving, only one or two sensors may be required using an exemplary implementation according to the present invention instead of three or four sensors, as in conventional systems. One sensor may be sufficient for blind spot monitoring, instead of two.

DETAILED DESCRIPTION

According to an exemplary embodiment and/or exemplary method of the present invention, a radar monopulse technique may be used for angular measurement, in which information about the angular deviation is able to be derived via the comparison of received signals in different, mutually overlapping beam lobes and knowledge of the radiation characteristics themselves (comparable to so-called "best fit matching" of the received signals). The exemplary evaluation method may be similar to the one used also in long range radar (LRR, ACC). In LRR radar, three or four reception lobes are formed, and their mutual overlapping is drawn upon for the angle estimation using the comparison of the received signals.

Figure 1:
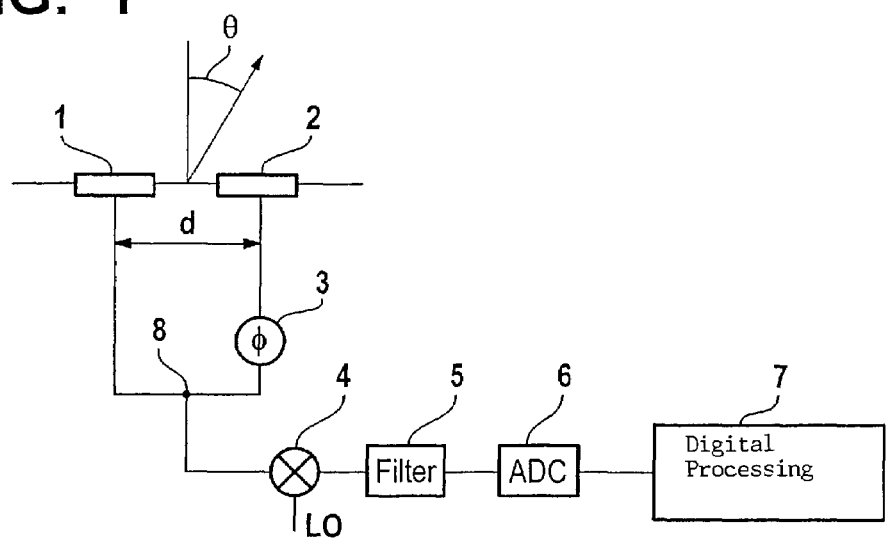
FIG. 1 shows an implementation according to an exemplary embodiment of the present invention having a dual beam antenna and a switchable phase shifter.

In an exemplary device according to the present invention for measuring angular positions, two different receiving characteristics are generated having as widely overlapping areas as possible. To do this, according to FIG. 1, at least two antenna elements 1 and 2 are used, each having adjustable oscillation phases. The different phase conditions are produced by an interposed HF component, and in the example according to FIG. 1 this is a switchable phase shifter 3, which is interposed in one of the two antenna paths shown here. By switching phase shifter 3, the oscillation phase of antenna element 2 is set differently from that of antenna element 1, whereby the directivity characteristics of the overall system may be considerably influenced. The signals of both antenna elements 1 and 2 in the reception path are subsequently brought together additively (summation node 8) and supplied to a mixer unit 4 (mixture with a mixing oscillator LO) and to further processing (filtering 5, analog/digital conversion (ADC) 6, evaluation device 7).

Figure 2:
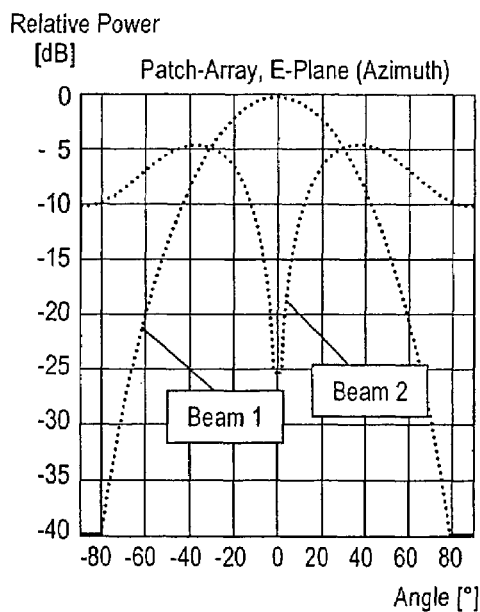
FIG. 2 shows the amplitude curve of a dual beam sensor.
Figure 3:
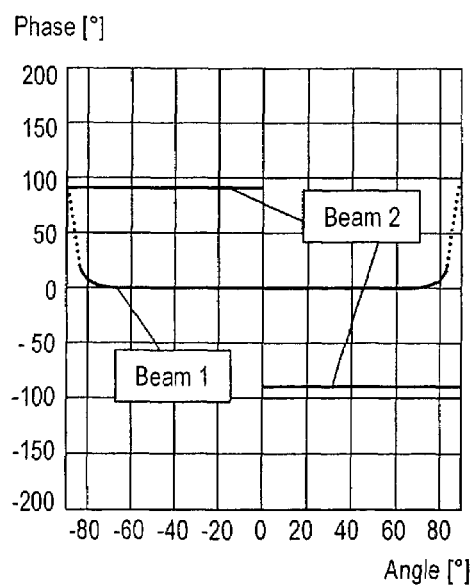
FIG. 3 shows the phase curve of a dual beam sensor.

FIG. 2 shows, for example, for a simple model of a patch antenna (for other antenna element characteristics, slightly different beam characteristics come about) the amplitude characteristics of the overall system for both switching conditions of phase shifter 3. The characteristics of beam 1 come about because of the in-phase control of both antenna elements, i.e. phase shifter 3 is in switching state 0° (beam 1=composite beam or in-phase beam). Thereby, in the main beam direction, a maximum forms in the common beam characteristics, by the constructive superimposition of in-phase components. Beam 2 is obtained by a phase shift of 180° in the path of antenna element 2 (or 1), and in the main beam direction, the components of antenna elements 1 and 2 thereby exactly cancel each other (destructive superimposition), so that the direction characteristics in this direction form a zero point (beam 2=difference beam or push-pull beam). The result on the side is a symmetrical forming of two main lobes that are identical in the ideal case. FIG. 3 shows the appertaining phase curves of both receiving characteristics. While the phase of beam 1 is (mirror) symmetrical to the main beam direction for reasons of symmetry, a centrosymmetric curve comes about for beam 2. This is decisive for the intended angle determination of a target, because a decision is only possible by the non-symmetry of at least one of the two phase curves, as to whether there is a target to the left or to the right with respect to the orientation of the sensor.

For the angle determination itself, back and forth switching takes place between the two phase states, and thereby between the two directivity characteristics (operation in time-division multiplexing). This switching takes place so rapidly that the influence of amplitude changes and phase changes of the incident wave front of a target as a result of relative motions of the target (target fluctuations) or of the transmitter with respect to the receiving antenna is negligible or is still able to be compensated for by appropriate correcting measures. Only then may it be possible to have sufficiently accurate information about which portion of a relative amplitude change and phase change of both directivity characteristics in the receiving channel is to be apportioned to the angular deviation of the target, and not perhaps to other effects named above. On the other hand, the switching period should also not be too small, since otherwise the cost-effective approach of the direct mixing of the HF carrier signal into the NF baseband (the so-called homodyne formulation, baseband frequency portions in the kHz range) may have to be appropriately modified. To obtain the optimal switching frequency between the antenna characteristics, the relative motions of targets or sensor carriers (one's own vehicle) may need to be negligible or able to be compensated for in the evaluation (target angle estimation), (determining for the upper limit of the switching period) but on the other hand a homodyne formulation (determining for the lower limit of the switching period). At HF carrier frequencies in the GHz range, switching periods in the range of a few µs, e.g. 5 to 50 µs may be desired.

If these time-related effects (target fluctuations, relative motions) are minimal or if they are appropriately compensated for or taken into consideration by correcting variables, the angle of the target is given by a comparison of the relative amplitude change and phase change in the receiving path in both switching states having the two complex-valued directivity characteristics of the antenna system (composite and differential beam). Over the entire angle range, in order that no ambiguities shall appear with respect to the comparison of the received signals to the directivity characteristics, additional lobes (secondary lobes) in beams 1 and 2 should be avoided. This may be possible if, for example, the distance d of the two antenna elements (see FIG. 1) is within the range of the half wavelength, for instance, at 24 GHz approximately 6.5 mm.

Figure 4:
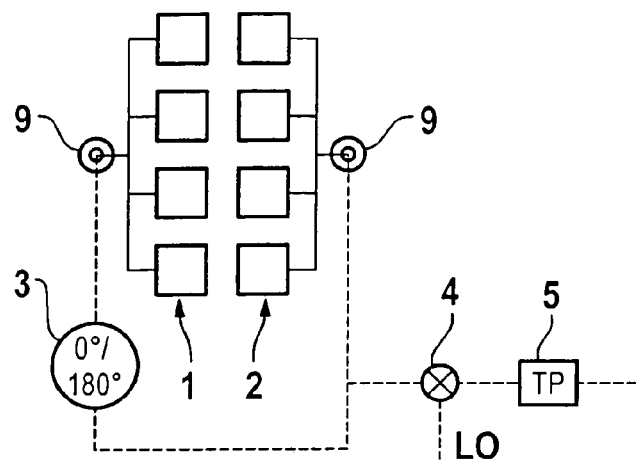
FIG. 4 shows a dual beam antenna with wiring.

FIG. 4 shows an exemplary embodiment in which the two antenna elements 1 and 2 are formed here, for example, in each case by four radiating elements. These have the task, at vertical positioning to the roadway surface after being assembled in the vehicle, to focus the energy in the vertical direction (elevations focusing) in order thereby to attain an appropriate range, but also in order not to receive reflections from the roadway that are too strong. In the horizontal plane (azimuth) only minor focusing comes about per column, so that the directivity diagrams in the azimuth are very broad, similar to the ones in FIG. 2, in order to obtain a horizontal detecting range that is as big as possible, and here too, to have an overlapping of the two directivity diagrams that is as broad as possible.

The sketched feed-throughs 9 in FIG. 4 have the task of concentrating the HF components which require component assembly, such as the 180° phase shifter 3, in the plane or rather on the layer where still further assemblies are required (mixer 4, etc), so that a double-sided assembly may be avoided. In this exemplary embodiment, filter 5 is a low-pass filter TP, provided that the radar sensor principle is based on a homodyne set-up, which indicates that the received signal is both transmitted using an oscillator (not shown here) and also mixed directly into the baseband (direct conversion). Other exemplary embodiments may be provided, such as a heterodyne set-up having mixing in an intermediate frequency plane via additional oscillator, with the filter then designed as a bandpass.

Figure 5A:
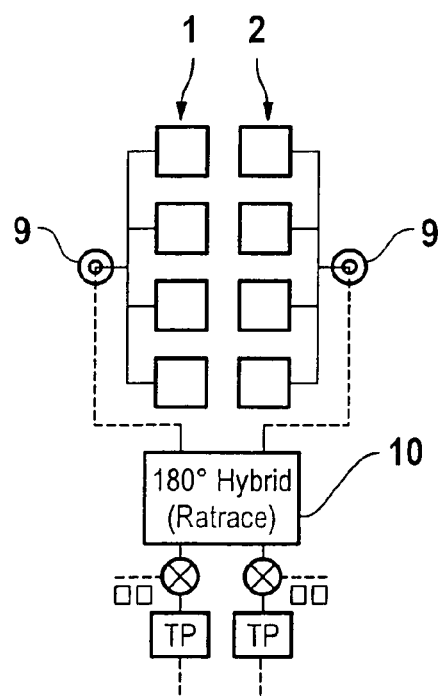
FIGS. 5a and 5b show dual beam antennas having an 180° hybrid (rat race).

FIG. 5a shows still another exemplary embodiment of how the angle determination according to the type described above may be made. As the phase-setting element, a so-called 180° hybrid 10 is used, which may be referred to "a rat race". This has the property of uniformly subdividing a signal incident at a gate to the gates lying opposite to it, and at a relative phase difference of 180°, while the fourth gate is isolated. Because of the reciprocity and linearity of this component, it may be possible, in the same manner, to emit two signals to two input gates and to pick off, at the two gates lying opposite to this, the composite signal and the differential signal, which, in this case, may be the composite beam and the differential beam. What may be desired in this approach is that both beams are present at the same time, so that the negative influence of target fluctuations or relative motions does not appear here. An undesired feature may be that both gates each require one mixer of their own, one filter and one AD converter (hardware expenditure).

Figure 5B:
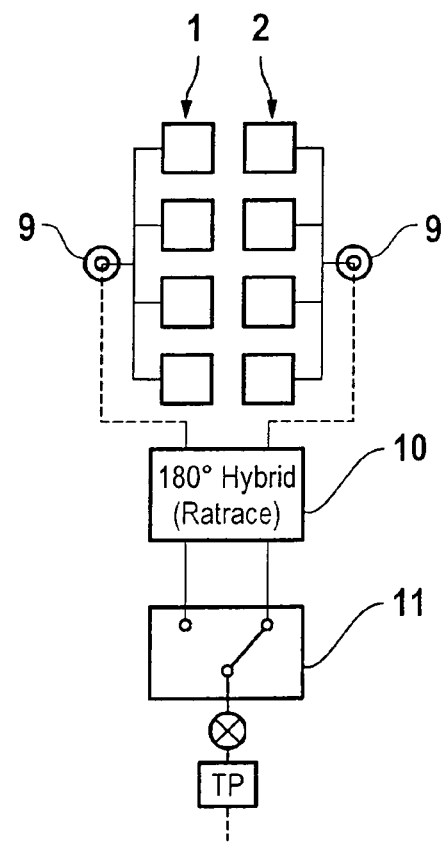

Alternatively, the two gates of the rat race may also be supplied to a mixer in time-division multiplexing via a suitable transfer switch (FIG. 5b).

Figure 6:
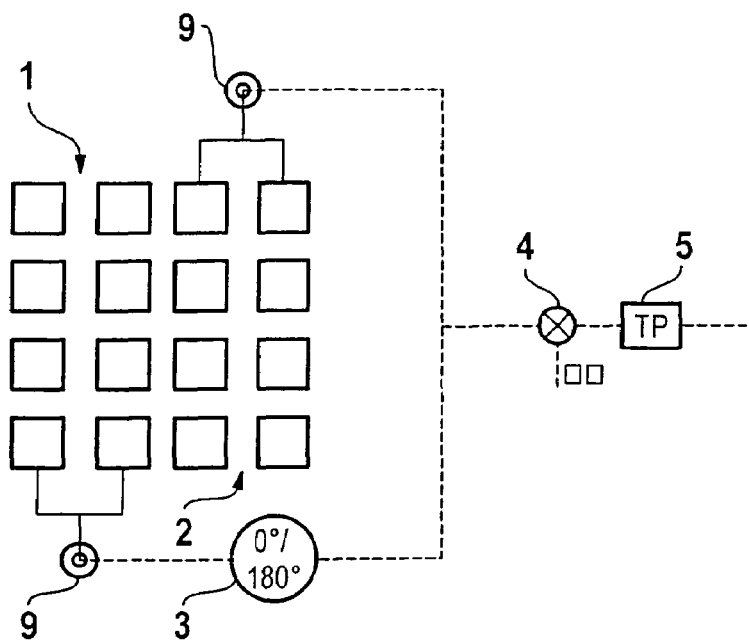
FIG. 6 shows an antenna system having 2×2 columns for time-division multiplex operation.
Figure 7:
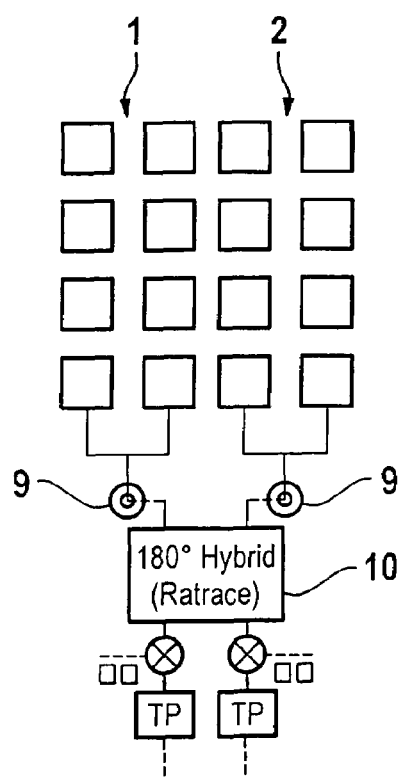
FIG. 7 shows the antenna system as in FIG. 6 having an 180° hybrid.

FIGS. 6 and 7 further show exemplary embodiments having two columns each per antenna element. By an exemplary embodiment having more than one antenna column per antenna element, a concentration of the received energy may be provided in a horizontal plane. In this manner, a greater antenna gain, and thus a greater radar operating range may be achieved, whereas the overlap area of composite beam and differential beam may be hemmed in thereby. This may be desired for functions like, for instance, backup assistance. This exemplary embodiment may also be desired for certain functions in which a certain suppression of signals (disturbing station) in the side region is rather desirable, e.g. from guardrails or other developments at the edge of the roadway. This is directly supported by the strong focusing of multi-column antenna elements.

Phase shifter 3 may be developed as PIN diode phase shifter.

A radar sensor according to an exemplary embodiment of the present invention may include, in an integrated configuration, the phase shifter or possibly the transfer switch, the signal junction (T junction, Wilkinson divider, or others), the mixer and possibly additional low-noise preamplifiers (LNAs) in an MMIC (monolithic microwave integrated circuit).

As phase shifter 3 one may also use an RF MEMS 180° phase shifter (RF radio frequency, MEMS=microelectromechanical system).

The antenna elements may be provided in various configurations: radiating element, columns, several columns jointly per antenna element, so-called patch radiators, etc.

As transfer switch 11, PIN diode switches or MEMS switches may be used.

What is claimed is:

1. A device for measuring angular positions using radar pulses and mutually overlapping antenna beam characteristics, comprising:
    at least two antenna elements;
    a phase shifter arranged in a signal path of at least one of the at least two antenna elements, wherein the phase shifter is configured to switch between different phase states in a time-division multiplexing manner to change a radiation characteristic of the at least one of the at least two antenna elements;
    an evaluation unit to jointly evaluate signals received from the at least two antenna elements;
    a 180° hybrid phase setting element to connect the at least two antenna elements; and
    a transfer switch arranged at an output of the 180° hybrid phase setting element for evaluating a composite beam and a differential beam of at least two antenna elements via a mixer in time-division multiplexing.

2. The device of claim 1, wherein the device is configured to obtain an angle of a target by comparison of relative amplitude changes and phase changes of radar pulses in a receiving path in at least two switching states of the phase shifter.

3. The device of claim 1, wherein the phase shifter is configured to assume phase states 0° and 180°.

4. The device of claim 1, wherein the device is configured to set a switch-over time of the phase shifter with a switch-over time between two beam characteristics so that a relative motion of a target and antenna element carriers is at least one of negligible and compensated in the evaluation.

5. The device of claim 1, wherein the device is configured to set a switch-over time of the phase shifter with a switch-over time between two radiation characteristics for application of a homodyne operation.

6. The device of claim 4, wherein the device is configured to operate in a GHz range and the switch-over time is set in a range of 5 to 50 μs.

7. The device of claim 5, wherein the device is configured to operate in a GHz range and the switch-over time is set in a range of 5 to 50 μs.

8. The device of claim 1, further comprising:
    at least a third and a fourth antenna elements arranged with the at least two antenna elements to form a row and column arrangement of at least two groups of antenna elements that are evaluated jointly and simultaneously for at least one of an elevation focusing and azimuth focusing,
    wherein the phase shifter is configured to be switchably assigned to at least one group of the at least two groups of antenna elements.

9. The device of claim 8, wherein the phase shifter is configured as at least one of a PIN diode phase shifter and a MEMS phase shifter.

10. The device of claim 1, wherein high-frequency components that require assembly are applied to only one side of a printed-circuit board facing away from the antenna elements.

* * * * *